United States Patent

Morimoto et al.

[11] Patent Number: 6,005,323
[45] Date of Patent: Dec. 21, 1999

[54] BRUSH HOLDING DEVICE USED IN MOTOR, AND METHOD OF ASSEMBLING BRUSH HOLDING FRAME IN THE DEVICE

[75] Inventors: Yoshihiro Morimoto; Nobuhiko Shimizu; Kazuya Sakata, all of Tokyo, Japan

[73] Assignee: Mitsubishi Denki Kabushiki Kaisha, Tokyo, Japan

[21] Appl. No.: 09/175,416

[22] Filed: Oct. 20, 1998

[30] Foreign Application Priority Data

Mar. 23, 1998 [JP] Japan .................................. 10-074329

[51] Int. Cl.[6] ..................................................... H02K 13/00
[52] U.S. Cl. ............................. 310/239; 310/43; 310/91; 310/242; 310/245
[58] Field of Search .................................. 310/43, 91, 42, 310/239, 242, 245, 248, 249, 241

[56] References Cited

U.S. PATENT DOCUMENTS

| | | | |
|---|---|---|---|
| 4,906,884 | 3/1990 | Tashigawara | 310/268 |
| 5,070,270 | 12/1991 | Morikane | 310/239 |
| 5,148,072 | 9/1992 | Shiroyama | 310/239 |
| 5,648,695 | 7/1997 | Yamaguchi et al. | 310/242 |

FOREIGN PATENT DOCUMENTS 3-18658  2/1991  Japan .

*Primary Examiner*—Nestor Ramirez
*Assistant Examiner*—Tran N Nguyen
*Attorney, Agent, or Firm*—Sughrue, Mion, Zinn, Macpeak & Seas, PLLC

[57] ABSTRACT

The invention relates to a brush holding device used in a motor, and a method of assembling a brush holding frame onto a base plate in the brush holding device. In the brush holding device, flanged portions are protruded from both sides of a lower portion of a brush holding frame, and a pair of fixing portions each having a recessed portion substantially identical in shape to a cross-sectional shape of a corresponding one of said flanged portions are provided. The brush holding frame is inserted between the fixing portions while being slid on and along a base plate surface until the flanged portion on both sides of the brush holding frame are respectively fitted to the recessed portions of the fixing portions. Cover portions are provided on the brush holding frame at a level lower than the guide hole so as to cover the fixing portions when the fixing portions and flanged portions are fitted together.

10 Claims, 4 Drawing Sheets

BRUSH HOLDING DEVICE USED IN MOTOR, AND METHOD OF ASSEMBLING BRUSH HOLDING FRAME IN THE DEVICE

BACKGROUND OF THE INVENTION

1. Field of the Invention

The present invention relates to a brush holding device used in a motor, which includes a brush holding frame having a guide hole through which a flexible conductive member leading an electric current to or from a brush is drawn out, and a base plate onto which both sides of the lower portion of the brush holding frame is fixed. The present invention also relates to a method of assembling the brush holding frame onto the base plate in the brush holding device.

2. Description of the Related Art

A typical brush holding device used in a motor is disclosed, for instance, in FIGS. 1 to 3 of Japanese Utility Model Kokai Publication No. Hei. 3-18658. The device will be explained with reference to the FIGS. 10 and 11 attached hereto. In these Figures, reference numeral 1 designates a brush; 2, a brush holding frame for holding the brush; 3, a flexible conductive member, so called as a pig-tail, for leading an electric current to or from the brush; 4, a guide hole perforated through the holding frame so that the flexible conductive member is drawn out therefrom; 5, a base plate onto which the brush holding frame is fixed; 6, a fixing-purpose caulking pawl implanted on the base plate; and 7, a hole of a holding frame through which the caulking pawl is passed.

The brush holding device 2 shown in these Figures is designed to adopt a fixing method in which the bottom surface of the brush holding frame 2 is placed onto the base plate surface so that the caulking pawls 6 are upwardly inserted into the respective holes 7 provided on both sides of the lower portion of the brush holding frame 2, and then the caulking pawls 6 are bent or beaten appropriately to fix the brush holding frame 2 onto the base plate 5 by "caulking".

This fixing method or fixing structure may arise a problem in that a short circuit occurs by the contact between the flexible conductive member 3 and the caulking pawl 6 formed by raising up a portion of the base plate 5 made of a steel plate since the flexible conductive member 3 so called as a pig-tail is elongated above a fixing region where the caulking pawl 6 is caulked.

For this reason, an insulative tube 8 is additionally required and an assembler is forced to carry out such a work that the flexible conductive member 3 is at least partially covered by the insulative tube 8 over a lengthwise region contactable with the fixing region, which results in the cost increase.

Since the brush holding frame 2 is fixed by bending or caulking the caulking pawl 6 and the brush holding frame 2 of this kind is made of synthetic resin, the brush holding frame 2 or its fixing region may accidentally deformed or damaged during the fixing work by beating. On the other hand, if the assembler carries out the fixing work while trying to avoid such accident, another problem arises in that the installation inevitably becomes unstable and the required sure fixing can not be achieved. In addition, the brush holding frame is generally molded of high-insulative synthetic resin.

SUMMARY OF THE INVENTION

The present invention was made in order to solve the above-noted problems, and an object of the present invention is to provide a brush holding device used in a motor, and a brush holding frame assembling method in the device, by which an insulative tube can be dispensed with, and the brush holding frame can be surely fixed in place without any deformation and damage.

To attain the above and other objects, according to a first aspect of the present invention, a brush holding device used in a motor is characterized by comprising:

a brush holding frame having a guide hole through which a flexible conductive member leading an electric current to or from a brush is drawn out; and a base plate onto which both sides of a lower portion of the brush holding frame are fixed, wherein a cover portion is provided on the brush holding frame at a level lower than the guide hole so as to cover a fixing region in the lower portion of the brush holding frame.

According to a second aspect of the present invention, a brush holding device used in a motor is characterized by comprising:

a brush holding frame having a guide hole through which a flexible conductive member leading an electric current to or from a brush is drawn out;

a base plate onto which both sides of a lower portion of the brush holding frame are fixed, the base plate having a base plate surface; and fixing means including:

flanged portions respectively protruded from the sides of the lower portion of the brush holding frame, each of the flanged portions defining a bottom surface adapted to contact the base plate surface; and a pair of fixing portions each having a recessed portion substantially identical in shape to a cross-sectional shape of a corresponding one of the flanged portions, the fixing portions being raised up from the base plate surface such that the recessed portions are confronted with each other and the flanged portions are spaced from each other at a distance corresponding to a width of the brush holding frame, wherein the brush holding frame is inserted between the fixing portions while being slid on and along the base plate surface until the flanged portion on the sides of the brush holding frame are respectively fitted to the recessed portions of the fixing portions; and cover portions, provided on the brush holding frame at a level lower than the guide hole, for covering the fixing portions under a state where the fixing portions and flanged portion of the fixing means are fitted together.

According to a third aspect of the present invention, a brush holding device used in a motor is characterized by comprising:

a brush holding frame having a guide hole through which a flexible conductive member leading an electric current to or from a brush is drawn out;

a base plate onto which a plurality of brush holding frames are arranged and fixed in an annular manner with distal ends of brushes being directed toward a center, the base plate having a base plate surface; and fixing means including:

flanged portions respectively protruded from both sides of a lower portion of the brush holding frame, each of the flanged portions defining a bottom surface adapted to contact the base plate surface; and a pair of fixing portions each having a recessed portion substantially identical in shape to a cross-sectional shape of a corresponding one of the flanged portions, the fixing portions being raised up from the base plate surface such that the recessed portions are confronted with each other and the flanged portions are spaced from each other at a distance corresponding to a width of the brush holding frame, wherein the brush holding frame is inserted between the fixing portions while being slid on and along the base plate surface until the flanged portion on the sides of the brush holding frame are respectively fitted to the recessed portions of the fixing portions;

positioning means including:

a protrusion provided on a bottom surface side of the brush holding frame; and a receptacle opening provided in the base plate, wherein the protrusion and the receptacle opening are fitted to each other under a state where the fixing portions and the flanged portions are fitted together; and a movement restricting portion provided on the base plate in a flexible manner so as to contact an engaging portion of the brush holding frame positioned in place.

According to a fourth aspect of the present invention, a brush holding device used in a motor is characterized by comprising:

a brush holding frame having a guide hole through which a flexible conductive member leading an electric current to or from a brush is drawn out;

a base plate onto which a plurality of brush holding frames are arranged and fixed in an annular manner with distal ends of brushes being directed toward a center, the base plate having a base plate surface; and fixing means including:

flanged portions respectively protruded from both sides of a lower portion of the brush holding frame, each of the flanged portions defining a bottom surface adapted to contact the base plate surface; and a pair of fixing portions each having a recessed portion substantially identical in shape to a cross-sectional shape of a corresponding one of the flanged portions, the fixing portions being raised up from the base plate surface such that the recessed portions are confronted with each other and the flanged portions are spaced from each other at a distance corresponding to a width of the brush holding frame, wherein the brush holding frame is inserted between the fixing portions while being slid on and along the base plate surface until the flanged portion on the sides of the brush holding frame are respectively fitted to the recessed portions of the fixing portions;

cover portions, provided on the brush holding frame at a level lower than the guide hole, for covering the fixing portions under a state where the fixing portions and flanged portion of the fixing means are fitted together.

positioning means including:

a protrusion provided on a bottom surface side of the brush holding frame; and a receptacle opening provided in the base plate, wherein the protrusion and the receptacle opening are fitted to each other under a state where the fixing portions and the flanged portions are fitted together; and a movement restricting portion provided on the base plate in a flexible manner so as to contact an engaging portion of the brush holding frame positioned in place.

According to a fifth aspect of the present invention, a method of assembling a brush holding frame in a brush holding device used in a motor is characterized by comprising:

a brush holding frame having a guide hole through which a flexible conductive member leading an electric current to or from a brush is drawn out;

a base plate onto which a plurality of brush holding frames are arranged and fixed in an annular manner with distal ends of brushes being directed toward a center, the base plate having a base plate surface; and fixing means including:

flanged portions respectively protruded from both sides of a lower portion of the brush holding frame, each of the flanged portions defining a bottom surface adapted to contact the base plate surface; and a pair of fixing portions each having a recessed portion substantially identical in shape to a cross-sectional shape of a corresponding one of the flanged portions, the fixing portions being raised up from the base plate surface such that the recessed portions are confronted with each other and the flanged portions are spaced from each other at a distance corresponding to a width of the brush holding frame, wherein the brush holding frame is inserted between the fixing portions while being slid on and along the base plate surface until the flanged portion on the sides of the brush holding frame are respectively fitted to the recessed portions of the fixing portions;

positioning means including:

a protrusion provided on a bottom surface side of the brush holding frame; and a receptacle opening provided in the base plate, wherein the protrusion and the receptacle opening are fitted to each other under a state where the fixing portions and the flanged portions are fitted together; and a movement restricting portion provided on the base plate in a flexible manner so as to contact an engaging portion of the brush holding frame positioned in place, the method comprising the steps of:

inserting the brush holding frame between the fixing portions of the fixing means such that a bottom surface of the brush holding frame is slid on and along the base plate surface with the protrusion on the bottom surface side of the brush holding frame being fitted to the receptacle opening of the base plate under a state where the brush holding frame is directed from an outer periphery of the base plate toward the center of the base plate, until the flanged portions on the both sides of the brush holding frame are fitted into and fixed by the respective recessed portions of the fixing portions; and bringing a distal end of the movement restricting portion into contact with a predetermined portion on a side face of the brush holding frame, thereby fixedly assembling the brush holding frame in place.

According to a sixth aspect of the present invention, in a brush holding device used in a motor according to any one of the second to fourth aspects of the present invention, it is characterized in that each of the fixing portions is in the form of a plate-like protrusion formed by punching the base plate and raised up from the base plate surface, and each of the recessed portion of the fixing portions is formed by bending one of the plate-like protrusions toward the other.

According to a seventh aspect of the present invention, in a brush holding device used in a motor according to the second or the fourth aspect of the present invention, it is characterized in that the receptacle opening is in the form of a notched hole opened outwardly toward an outer periphery of the base plate, and the notched hole has a guide edge contacting the protrusion of the brush holding frame to guide the brush holding frame in a direction toward the center of the base plate during when the brush holding frame is assembled to the base plate while being slid on and along the base plate surface.

According to an eighth aspect of the present invention, in a brush holding device used in a motor according to the third or the fourth aspect of the present invention, it is characterized in that the engaging portion of the brush holding frame includes an end of the flanged portion directed toward an outer periphery of the base plate, or an end of the cover portion directed toward the outer periphery of the base plate.

According to a tenth aspect of the present invention, in a brush holding device used in a motor according to the third or the fourth aspect of the present invention, it is characterized in that the movement restricting portion is in the form of a plate-like member formed by punching the base plate.

DETAILED DESCRIPTION OF THE PREFERRED EMBODIMENT

Figure 1:
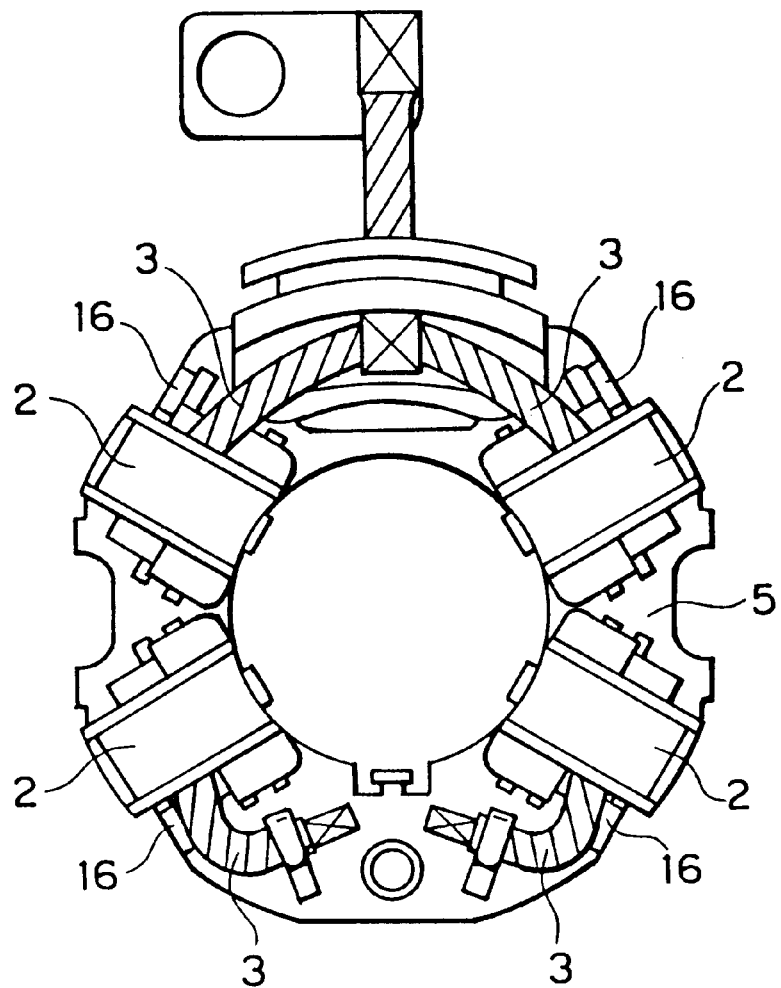
FIG. 1 is a plane view showing an embodiment of the present invention.

A preferred embodiment of the present invention will now be described with reference to FIGS. 1 to 9.

First of all, a brush holding device will be described with reference to FIGS. 1 and 2 which show a brush holding device in a plane view and a brush holding frame in sectional view, respectively.

In these Figures, reference numeral 1 designates a brush the distal end of which is brought into contact with a communicator installed in a motor; 2, a brush holding frame molded of high-insulative synthetic resin; 3, and a flexible conductive member, so called as a pig-tail, for leading electric current to or from the brush 1. The flexible conductive member 3 is drawn out from a guide hole 4 provided in a side face of the brush holding frame 2. Reference numeral 5 designates a base plate onto which the brash holding frame 2 is assembled and fixed. In the brush holding device according to this embodiment, four brush holding frames 2 are arranged in an annular manner on the base plate surface of the base plate 5 so that the distal end of each brush 1 is oriented toward a center of the base plate 5, and the lower portion of each brush holding frame 2 is fixed to the base plate 5 at both sides.

Figure 3:
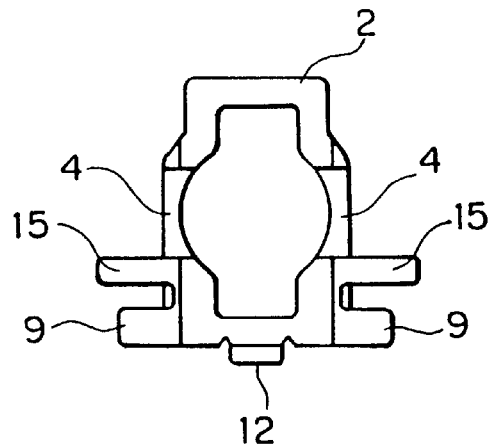
FIG. 3 is a front view of the brush holding frame.
Figure 4:
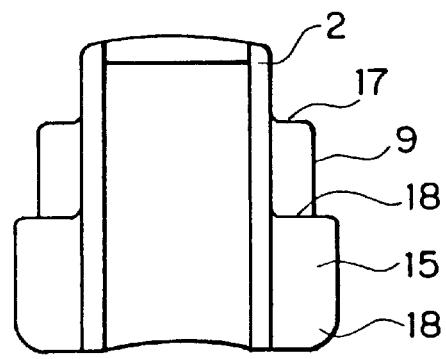
FIG. 4 is a plane view of the brush holding frame.
Figure 5:
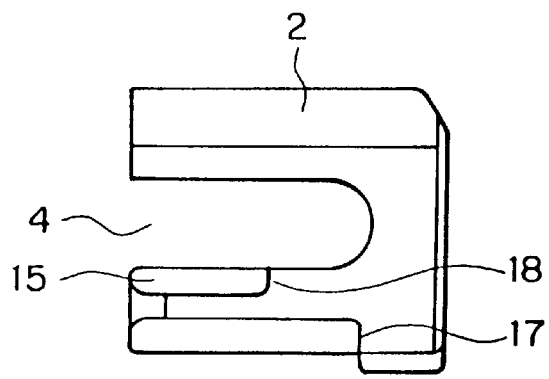
FIG. 5 is a side view of the brush holding frame.
Figure 6:
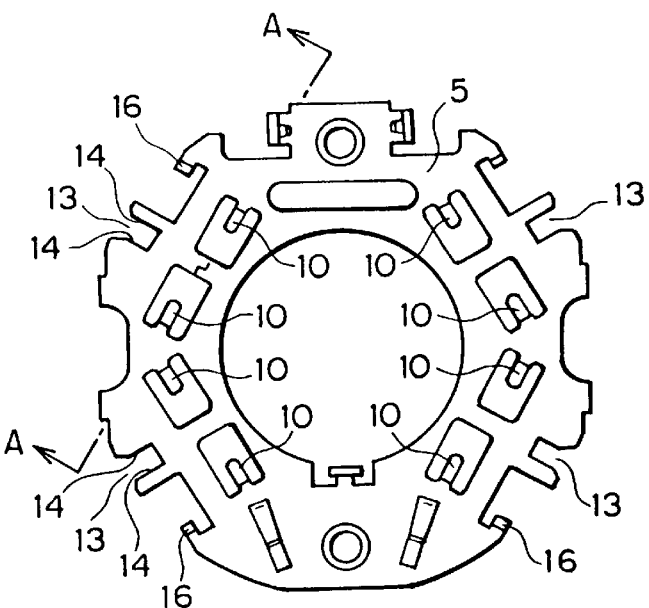
FIG. 6 is a plane view of the base plate.
Figure 7:
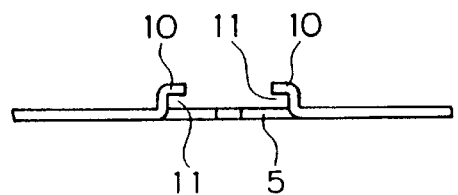
FIG. 7 is a sectional view taken along the line A—A of FIG. 6.
Figure 8:
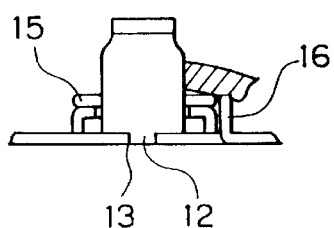
FIG. 8 shows a state where a movement restricting portion is raised up.
Figure 9:
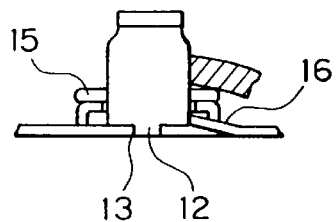
FIG. 9 shows a state where the movement restricting portion is brought in contact with the brush holding frame.
Figure 10:
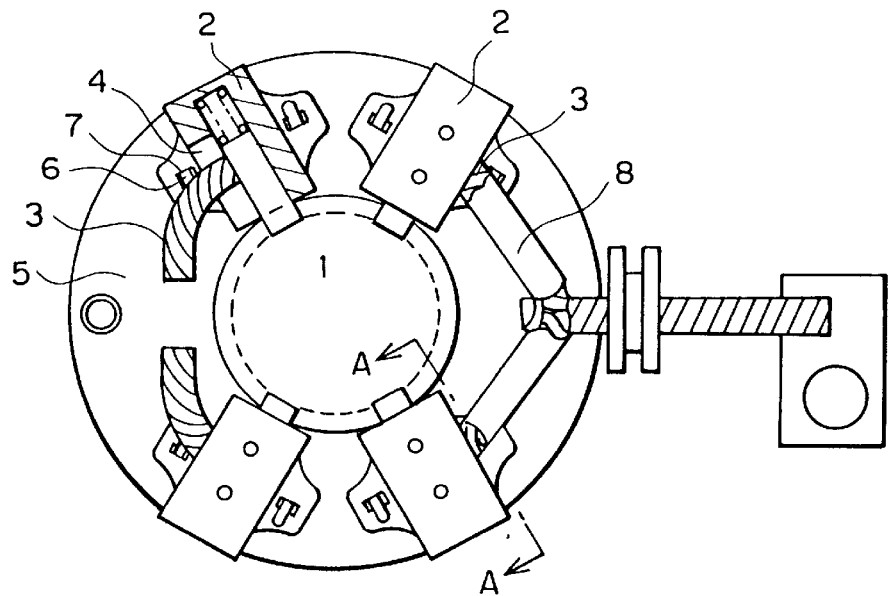
FIG. 10 is a plane view showing a conventional brush holding device of a comparative example.
Figure 11:
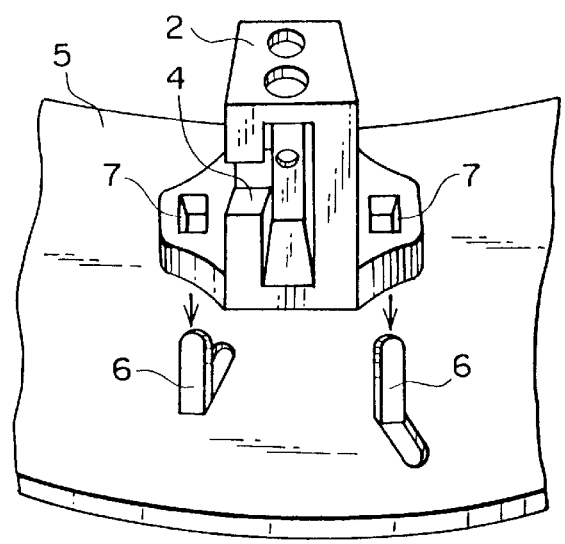
FIG. 11 is an exploded perspective view of a brush holding frame and a base plate in the device shown in FIG. 10.
Figure 12:
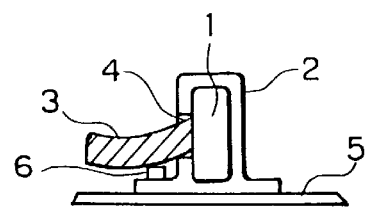
FIG. 12 shows a positional relationship between a fixing portion of the conventional brush holding frame and a pig tail in the device shown in FIG. 10.

Next, fixing means for mounting and fixing the brash holding frame 2 onto the base plate 5 will be described with reference to FIGS. 3 to 6. FIG. 3 is a front view of the brush holding frame 2, FIG. 4 is a plane view thereof, and FIG. 5 is a right side view thereof. FIG. 6 is a plane view of the base plate 5, and FIG. 7 is a sectional view taken along line A—A of FIG. 6.

As can be seen from these Figures, flanged portions 9,9 are laterally protruded from both sides of the lower portion of the brash holding frame 2 so that their bottom surfaces contact the surface (i.e. the base plate surface) of the base plate 5. This arrangement serves as a receptacle in fixing the brash holding frame 2 onto the base plate 5, and it is preferable, from a view point of stability in installation, to form the flanged portion 9 such that a sufficient width (length) is ensured in its protruded direction and/or that the flanged portion 9 is elongated along the length of the side face of the brush holding frame 2 to a certain degree as shown, since the contact area between the brush holding frame 2 and the base plate surface can be made larger.

On the other hand, the base plate 5 is provided with a pair of mating fixing portions 10,10 for the right and left flanged portions 9,9 protruded laterally from the both side of the lower portion of the brush holding frame 2. The pair of fixing portions are raised up from the base plate surface of the base plate 5 in such a manner that the lateral distance therebetween corresponds to the lateral length of the bottom surface of the brush holding frame 2 including the width of the protruded flanged portions 9,9. Each of the fixing portions 10,10 has a recessed portion 11 located in a side where the pair of the fixing portions are confronted with each other and each of the fixing portions is confronted with the base plate surface. The recessed portion 11 is configurated to receive and downwardly depress at least a portion of an upper edge of the distal end of the laterally protruded flanged portion. The recessed portion 11 in this embodiment is formed by punching the base plate to form a plate-like protrusion raised up from the base plate surface and then bending the plate-like protrusion in a direction toward the other plate-like protrusion to form a L-shape.

As described, the fixing means includes the flanged portions 9,9 provided on the brush holding frame 2, and the recessed portions 11, 11 of the pair of fixing portion 10,10 provided on the base plate 5. The brush holding frame 2 is inserted between the pair of the fixing portions 10,10 such that the bottom surface of the brush holding frame 2 is slid on and along the base plate surface, and the flanged portions 9,9 on both sides of the brush holding frame 2 are respectively fitted into and fixed by the recessed portions 11,11 of the fixing portions 10,10 located on both sides. In this embodiment, in order to tightly fit the flanged portions 9,9 into the recessed portions 11,11, each of the recessed portions 11,11 is designed to have a shape substantially identical to a sectional-shape of the corresponding flanged portion 9. With this fixing means, it is possible to surely inhibit at least the following movement: the offset of the brush holding frame 2 in the lateral direction (i.e. in a circumferential direction of the circular base plate 5); the lateral rattle of the brush holding frame 2; and the vertical movement of the brush holding frame 2 in a direction perpendicular to the base plate surface.

Next, positioning means for determining the mounting position of the brush holding frame 2 with respect to the base plate 5 will be described with reference to FIGS. 5 and 6.

This positioning means is constructed by a protrusion 12 provided on the bottom surface of the brush holding frame 2, and a receptacle opening 13 provided in the base plate 5. The protrusion 12 in this embodiment is rectangular as best shown in FIGS. 3 and 5, and downwardly protruded from the bottom surface of the brush holding frame 2 at a protruded amount corresponding to a thickness of the base plate 5. On the other hand, the receptacle opening 13 in the base plate 5 is in the form of a notched hole of the substantially U-shape, which is opened outwardly to the outer edge of the base plate 5 and into which the rectangular protrusion 12 is just fitted.

The notched hole is formed with a guide edge 14 which contacts the edge of the protrusion 12 of the brush holding frame 2 to guide the brush holding frame 2 in a proper advancing direction, i.e. in a direction toward a center of the base plate 5, during when the brush holding frame 2 is assembled to the base plate 5 while being slid on and along the base plate surface. That is to say, the two side edges of the notched hole, extending in the sliding direction of the protrusion 12, are used as a guide during when the brush holding frame 2 is moved toward and inserted between the pair of fixing portion 10,10 provided on the base plate 5 with the bottom surface of the brush holding frame 2 being kept in contact with and slid along the base plate surface.

It is preferable to set the cutting-in depth of the notched hole from the base plate outer periphery toward the base plate center such that if the protrusion 12 is engaged with the notched hole serving as the receptacle opening, then the flanged portion 9 of the brush holding frame 2 is surely fitted to the fixing portion 10 of the base plate 5 and the distal end of the brush reaches a region including a proper position with respect to the communicator.

With this positioning means, it is possible to easily determine the predetermined fixed position of the brush holding frame 2 to the base plate 5, thereby enhancing the assembling accuracy and working efficiency. Further, in case where the positioning means is constructed according to the embodiment, upon fitting of the protrusion 12 and the receptacle opening 13 each in the form of rectangular shape, the movement, offset and so on of the brush holding frame 2 in the circumferential direction and in the direction toward the center of the base plate can be surely inhibited.

Figure 2:
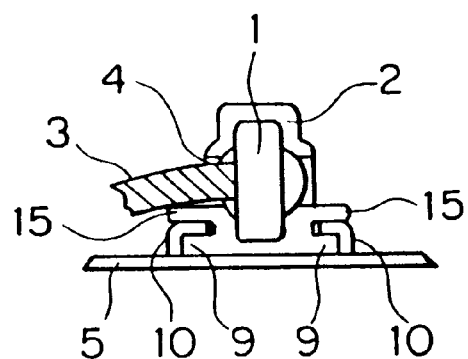
FIG. 2 is a front view showing a brush holding frame mounted on a base plate with a brush set therein.

As can be inferred from FIGS. 1 and 2, even if the brush holding frame 2 is positioned in the base plate 5 and assembled in that predetermined position in this manner, the short circuit may accidentally occur due to the contact between the flexible conductive member 3 and the fixing portion 10 implanted on the base plate 5 made of steel plate since the fixed region where the fixing portions 10,10 of the base plate 5 depressingly and partially covers the flanged portions 9,9 is located just below a pass in which the flexible conductive member 3 drawn out from the brush 1 through the guide hole 4 of the brush holding frame 2 is elongated.

For this reason, according to the present invention, there is provided a cover portion 15, protruded from each side face of the brush holding frame 2 at a level lower than the guide hole 4, for covering the above fixed region at both sides of the lower portion of the brush holding frame 2. The cover portion 15 in the embodiment is configurated such that a rectangular plate is horizontally protruded in a pent-roof manner. Of course, the cover portion 15 should not be restricted to this configuration, and may be modified in various ways as far as it prevents the flexible conductive member 3 so called as pig-tail from contacting the fixing portion 10 and the base plate 5. Since the brush holding frame 2 is generally manufactured by the injection-molding of the high-insulative synthetic resin, the cost increase due to the provision of the cover portion 15 is almost disregardable in comparison to the cost decrease by dispensing with the insulative tube 8 and the covering work thereby, so that the remarkable cost decrease can be achieved as a whole.

Next, a movement restricting portion will be described with reference to FIGS. 1, 2, 8 and 9.

The movement restricting portion 16 serves to avoid the movement of the brush holding frame 2, and is brought into contact with a predetermined engaging portion of the brush holding frame 2 positioned in place on the base plate 5, thereby avoiding at least the movement of the brush holding frame 2 in the outer peripheral direction of the base plate 5. The movement restricting portion 16 in this embodiment is in the form of a plate member provided by punching the base plate 5, which may be raised up from the base plate surface as required.

The engaging portion with which the plate member, i.e. the movement restricting portion 16 is to be contacted is constructed by an end 17 (see FIG. 4) of the flanged portion 9 formed on the brush holding frame 2, which is directed toward the outer periphery of the base plate 5. The cover 15 formed on the brush holding frame 2 may be extended and elongated in the direction toward the outer periphery of the base plate 5 as similarly to the flanged portion 9 shown so that its end 18 serves as the engaging portion. Of course, the engaging portion should not be restricted to these exemplified portions and may be modified in various ways. For example, a recess-like or protrusion-like portion of an engageable shape may be formed on the side face of the brush holding frame 2 at an appropriate position to serve as the engagement portion. Since the brush holding frame 2 is of the injection-molded product of synthetic resin, such engaging portion can be easily provided without the substantial cost increase.

In addition, a single movement restricting portion 16 is provided in this embodiment, but, of course a plurality of movement restricting portions may be separately provided at appropriate positions. In case where the movement restricting portion is provided in combination with the fixing means and the positioning means described with reference to the embodiment, the restricting portion can effectively avoid front-to-rear, right-and-left or up-and-down movement of the brush holding frame in cooperation with the effects produced by these means though the movement restricting portion depresses the brush holder in a single point contact.

Next, a method of assembling the brush holding frame onto the base plate in the brush holding device for the motor will be described.

The brush holding frame 2 is inserted between the fixing portions 10,10 of the fixing means such that the bottom surface of the brush holding frame 2 is slid on and along the base plate surface with the protrusion 12 on the bottom surface of the brush holding frame 2, directing the brush holding frame 2 from an outer periphery to the center of the base plate 5, being fitted to the receptacle opening 13 of the base plate 5 under a state where the distal end of the brush 1 is directed toward the center of the base plate 5, until the flanged portions 9,9 on both sides of the brush holding frame 2 are fitted into and fixed by the respective recessed portions 11,11 of the fixing portions.

Thereafter, the distal end of the movement restricting portion 16 is brought into contact with the engaging portion on the side face of the brush holding frame 2, whereby the brush holding frame is fixedly assembled in place.

By this assembling method, the fixing portions 10,10 inhibit at least both the movement in the vertical direction with respect to the surface of the base plate 5 and the movement in the circumferential direction of the base plate 5 as well as the movement restricting portion inhibits at least the movement in the radial direction of the base plate 5.

As described above, according to the first aspect of the present invention, an insulative tube for covering a flexible conductive member, so called as a pig-tail, can be dispensed with. Therefore, the number of component parts can be reduced, and it is possible to remove both the cost for the insulative tube and the working cost for application of the insulative tube as well as to omit one manufacturing step, thereby enhancing working efficiency and attaining remarkable cost reduction.

According to the second aspect of the present invention, in addition to the effect according to the first aspect of the present invention, when the brush holding frame is fixed to the base plate, the caulking is not required. Thus, the fixing work can be done speedy, easily and surely, and the fixing work is free from the possible damage of the brush holding frame caused in association with the caulking work can be surely avoided, thereby providing improved economical effect.

According to the third aspect of the present invention, when the brush holding frame is fixed to the base plate, the caulking work is not required. Thus, the fixing work can be done speedy, easily and surely, and the fixing work is free from the possible damage of the brush holding frame caused in association with the caulking work, thereby providing improved economical effect.

Further, with the positioning means, the mounting position can be easily determined, and thus the fixing work can be done speedy and easily.

Moreover, with the movement restricting means, in cooperation with the effect produced by fixing means and positioning means, the movement of the brush holding frame in front-to-rear, right-and-left and up-and-down directions can by surely inhibited even if the movement restricting means is brought into a single point contact with the brush holding frame.

According to the fourth aspect of the present invention, an insulative tube for covering a flexible conductive member, so called as a pig-tail, can be dispensed with. Therefore, the number of component parts can be reduced, and it is possible to remove both the cost for the insulative tube and the working cost for application of the insulative tube as well as to omit one manufacturing step, thereby enhancing working efficiency and attaining remarkable cost reduction.

Further, when the brush holding frame is fixed to the base plate, the caulking work is not required. Thus, the fixing work can be done speedy, easily and surely, and the fixing work is free from the possible damage of the brush holding frame caused in association with the caulking work, thereby providing improved economical effect.

Further, with the positioning means, the mounting position can be easily determined, and thus the fixing work can be done speedy and easily.

Moreover, with the movement restricting means, in cooperation with the effect produced by fixing means and positioning means, the movement of the brush holding frame in front-to-rear, right-and-left and up-and-down directions can be surely inhibited even if the movement restricting means is brought into a single point contact with the brush holding frame.

According to the fifth aspect of the present invention, when the brush holding frame is assembled and fixed to the base plate, the caulking work is not required, and the fixing can be made surely and stably. Further, with the positioning means, the mounting position can be easily determined, so that fixing work can be done speedy and easily. Moreover, the fixing work is free from the damage of the brush holding frame caused by the caulking work, thereby providing enhanced economical effect.

According to the sixth aspect of the present invention, in a brush holding device used in a motor as set forth in any one of the second to the fourth aspect of the present invention, the fixing portion can be formed relatively easily at a low cost without using separately a special member.

According to the seventh aspect of the present invention, in a brush holding device used in a motor as set forth in the second or the fourth aspect of the present invention, the assembling position and direction can be easily determined, and thus assembling work can be done speedy and easily.

According to the eight aspect of the present invention, in a brush holding device used in a motor as set forth in the third or the fourth aspect of the present invention, since the end of the already-provided flanged portion or the cover portion is utilized as the engaging portion on the brush holding frame, it is unnecessary to additionally provide an equipment used as the engaging portion, and thus manufacturing cost can be reduced.

According to the ninth aspect of the present invention, in a brush holding device used in a motor as set forth in the third or the fourth aspect of the present invention, the movement restricting portion can be formed relatively easily at a low cost without using an additional special member.

What is claimed is:

1. A brush holding device used in a motor, said device comprising:

a brush holding frame having a guide hole through which a flexible conductive member leading an electric current to or from a brush is drawn out;

a base plate onto which a plurality of brush holding frames are arranged and fixed in an annular manner with distal ends of brushes being directed toward a center, said base plate having a base plate surface; and fixing means including:

flanged portions respectively protruded from both sides of a lower portion of said brush holding frame, each of said flanged portions defining a bottom surface adapted to contact said base plate surface; and a pair of fixing portions each having a recessed portion substantially identical in shape to a cross-sectional shape of a corresponding one of said flanged portions, said fixing portions being raised up from said base plate surface such that said recessed portions are confronted with each other and said flanged portions are spaced from each other at a distance corresponding to a width of said brush holding frame, wherein said brush holding frame is inserted between said fixing portions while being slid on and along said base plate surface until said flanged portion on said sides of said brush holding frame are respectively fitted to said recessed portions of said fixing portions;

positioning means including:

a protrusion provided on a bottom surface side of said brush holding frame; and a receptacle opening provided in said base plate, wherein said protrusion and said receptacle opening are fitted to each other under a state where said fixing portions and said flanged portions are fitted together; and a movement restricting portion provided on said base plate in a flexible manner so as to contact an engaging portion of said brush holding frame positioned in place.

2. A brush holding device used in a motor according to claim 1, wherein said cover portions, provided on said brush holding frame at a level lower than said guide hole, for covering said fixing portions under a state where said fixing portions and flanged portion of said fixing means are fitted together.

3. A brush holding device used in a motor according to claim 1, wherein each of said fixing portions is in the form of a plate-like protrusion formed by punching said base plate and raised up from said base plate surface, and each of said recessed portion of said fixing portions is formed by bending one of said plate-like protrusions toward the other.

4. A brush holding device used in a motor according to claim 1, wherein said receptacle opening is in the form of a notched hole opened outwardly toward an outer periphery of said base plate, and said notched hole has a guide edge contacting said protrusion of said brush holding frame to guide said brush holding frame in a direction toward said center of said base plate during when said brush holding frame is assembled to said base plate while being slid on and along said base plate surface.

5. A brush holding device used in a motor according to claim 1, wherein said engaging portion of said brush holding frame includes an end of said flanged portion directed toward an outer periphery of said base plate, or an end of said cover portion, that is formed on the brush holding frame, and directed toward said outer periphery of said base plate.

6. A brush holding device used in a motor according to claim 1, wherein said movement restricting portion is in the form of a plate-like member formed by punching said base plate.

7. A brush holding device used in a motor, said device comprising:

a brush holding frame having a guide hole through which a flexible conductive member leading an electric current to or from a brush is drawn out;

a base plate onto which both sides of a lower portion of said brush holding frame are fixed, said base plate having a base plate surface; and fixing means including:

flanged portions respectively protruded from said sides of said lower portion of said brush holding frame, each of said flanged portions defining a bottom surface adapted to contact said base plate surface; and a pair of fixing portions each having a recessed portion substantially identical in shape to a cross-sectional shape of a corresponding one of said flanged portions, said fixing portions being raised up from said base plate surface such that said recessed portions are confronted with each other and said flanged portions are spaced from each other at a distance corresponding to a width of said brush holding plate, wherein said brush holding frame is inserted between said fixing portions while being slid on and along said base plate surface until said flanged portion on said sides of said brush holding frame are respectively fitted to said recessed portions of said fixing portions; and cover portions, provided on said brush holding frame at a level lower than said guide hole, for covering said fixing portions under a state where said fixing portions and flanged portion of said fixing means are fitted together.

8. A brush holding device used in a motor according to claim 7, wherein each of said fixing portions is in the form of a plate-like protrusion formed by punching said base plate and raised up from said base plate surface, and each of said recessed portion of said fixing portions is formed by bending one of said plate-like protrusions toward the other.

9. A brush holding device used in a motor according to claim 7, wherein said receptacle opening is in the form of a notched hole opened outwardly toward an outer periphery of said base plate, and said notched hole has a guide edge contacting said protrusion of said brush holding frame to guide said brush holding frame in a direction toward said center of said base plate during when said brush holding frame is assembled to said base plate while being slid on and along said base plate surface.

10. A brush holding device used in a motor, said device comprising:

a brush holding frame having a guide hole through which a flexible conductive member leading an electric current to or from a brush is drawn out; and a base plate onto which both sides of a lower portion of said brush holding frame are fixed, wherein a cover portion is provided on said brush holding frame at a level lower than said guide hole so as to cover a fixing region in said lower portion of said brush holding frame.

* * * * *